(12) United States Patent
Lambert et al.

(10) Patent No.: US 9,314,866 B2
(45) Date of Patent: Apr. 19, 2016

(54) MODIFICATION OF CONTROL PARAMETERS BASED ON OUTPUT POWER

(75) Inventors: Roger H. Lambert, West Lebanon, NH (US); Geoffrey H. Putnam, Topsham, VT (US)

(73) Assignee: Victor Equipment Company, Denton, TX (US)

( * ) Notice: Subject to any disclaimer, the term of this patent is extended or adjusted under 35 U.S.C. 154(b) by 877 days.

(21) Appl. No.: 13/480,826

(22) Filed: May 25, 2012

(65) Prior Publication Data

US 2012/0303175 A1 Nov. 29, 2012

Related U.S. Application Data

(60) Provisional application No. 61/490,329, filed on May 26, 2011.

(51) Int. Cl.
| | | |
|---|---|---|
| *B23K 9/10* | (2006.01) | |
| *B23K 9/095* | (2006.01) | |

(52) U.S. Cl.
CPC ............. *B23K 9/0953* (2013.01); *B23K 9/0956* (2013.01); *B23K 9/10* (2013.01)

(58) Field of Classification Search
CPC ............................... B23K 9/095; B23K 9/0953
USPC ........................................ 219/130.01–130.51
See application file for complete search history.

(56) References Cited

U.S. PATENT DOCUMENTS

| | | | | |
|---|---|---|---|---|
| 3,509,314 A | * | 4/1970 | Freytag ..................... | 219/137.71 |
| 3,950,759 A | * | 4/1976 | Ziegenfuss ................... | 346/33 R |
| 4,159,409 A | * | 6/1979 | Hedberg .................. | 219/130.21 |
| 4,300,035 A | * | 11/1981 | Johansson ................ | 219/130.21 |
| 4,300,036 A | * | 11/1981 | Johansson ................ | 219/130.33 |
| 4,319,124 A | * | 3/1982 | Johansson ................ | 219/130.21 |
| 4,447,700 A | * | 5/1984 | Cohen ......................... | 219/117.1 |
| 5,221,825 A | * | 6/1993 | Siewert et al. ........... | 219/130.01 |
| 5,223,683 A | * | 6/1993 | Ishizaka ....................... | 219/608 |
| 5,233,158 A | * | 8/1993 | Karakama et al. ........ | 219/130.33 |
| 5,270,516 A | * | 12/1993 | Hamamoto et al. ...... | 219/130.33 |
| 6,335,511 B1 | * | 1/2002 | Rothermel ............... | 219/130.51 |
| 6,441,342 B1 | * | 8/2002 | Hsu .......................... | 219/130.01 |
| 6,642,483 B1 | * | 11/2003 | Koga et al. .............. | 219/137 PS |
| 6,791,063 B2 | * | 9/2004 | Manthe .................... | 219/130.21 |
| 6,815,640 B1 | * | 11/2004 | Spear et al. ................. | 219/130.5 |
| 7,005,610 B2 | * | 2/2006 | Ihde et al. ................ | 219/137.71 |

(Continued)

FOREIGN PATENT DOCUMENTS

| | | |
|---|---|---|
| DE | 3523879 | 1/1987 |
| JP | 61071178 | 4/1986 |
| JP | 2003/071564 | 3/2003 |

OTHER PUBLICATIONS

Ex parte Gary M. Katz.*

(Continued)

*Primary Examiner* — Dana Ross
*Assistant Examiner* — Renee L Miller
(74) *Attorney, Agent, or Firm* — Kacvinsky Daisak Bluni PLLC

(57) ABSTRACT

A system and method is provided for calculating a power output and coordinating the reduction of voltage and wire speed. Specifically, provided is a power circuit for generating welding output power, and a control circuit in communication with the power circuit to modify voltage and wire feed speed based on the calculated welding output power.

15 Claims, 4 Drawing Sheets

(56) References Cited

U.S. PATENT DOCUMENTS

| | | | |
|---|---|---|---|
| 7,041,937 B2* | 5/2006 | Ihde et al. | 219/137.71 |
| 2002/0117489 A1* | 8/2002 | Arndt et al. | 219/130.5 |
| 2004/0079740 A1* | 4/2004 | Myers et al. | 219/130.51 |
| 2004/0173591 A1* | 9/2004 | Knoener | 219/130.5 |
| 2005/0016974 A1 | 1/2005 | Myers et al. | |
| 2005/0199605 A1* | 9/2005 | Furman et al. | 219/132 |
| 2006/0131291 A1* | 6/2006 | Kaufman et al. | 219/130.5 |
| 2006/0163229 A1* | 7/2006 | Hutchison et al. | 219/130.21 |
| 2007/0164007 A1* | 7/2007 | Peters et al. | 219/130.51 |
| 2007/0181553 A1* | 8/2007 | Stanzel et al. | 219/137.71 |
| 2007/0251932 A1* | 11/2007 | Vogel et al. | 219/130.4 |
| 2008/0078812 A1* | 4/2008 | Peters et al. | 228/101 |
| 2008/0156782 A1* | 7/2008 | Rice et al. | 219/130.21 |
| 2009/0184098 A1* | 7/2009 | Daniel et al. | 219/130.1 |
| 2009/0277893 A1* | 11/2009 | Speilman | 219/137.71 |
| 2010/0065540 A1* | 3/2010 | Ihara et al. | 219/130.21 |
| 2010/0108654 A1* | 5/2010 | Ulrich et al. | 219/130.5 |
| 2010/0126976 A1* | 5/2010 | Kawamoto et al. | 219/125.1 |
| 2010/0200553 A1* | 8/2010 | Yamazaki et al. | 219/130.51 |
| 2010/0230394 A1* | 9/2010 | Yokota et al. | 219/130.51 |
| 2010/0288734 A1* | 11/2010 | Dave et al. | 219/73.2 |
| 2010/0301029 A1* | 12/2010 | Meckler et al. | 219/130.1 |
| 2010/0308026 A1* | 12/2010 | Vogel | 219/130.21 |
| 2010/0314371 A1* | 12/2010 | Davidson et al. | 219/130.1 |
| 2011/0017718 A1* | 1/2011 | Kazmaier et al. | 219/137 PS |
| 2011/0108536 A1* | 5/2011 | Inada et al. | 219/130.1 |
| 2011/0309053 A1* | 12/2011 | Baus | 219/108 |

OTHER PUBLICATIONS

PCT Serial No. PCT/US2012/039563—Notification of Transmittal of the International Search Report and the Written Opinion of the International Searching Authority, Dated Sep. 28, 2012.

\* cited by examiner

MODIFICATION OF CONTROL PARAMETERS BASED ON OUTPUT POWER

CROSS REFERENCE TO RELATED APPLICATIONS

This application claims the benefit of U.S. Provisional Patent Application No. 61/490,329 filed May 26, 2011, the content of which is hereby incorporated by reference in its entirety.

BACKGROUND

The present application generally relates to a welding system.

SUMMARY

A system and method is provided for calculating a power output and coordinating the reduction of voltage and wire speed; if the computed power output exceeds the power supply capacity.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

The term "substantially" used herein with reference to a quantity or mathematical relationship includes (1) a variation in the recited quantity or relationship of an amount that is insubstantially different from a recited quantity or relationship for an intended purpose or function, or (2) a variation in the recited quantity or relationship of an amount that produces the same quality.

Figure 1:
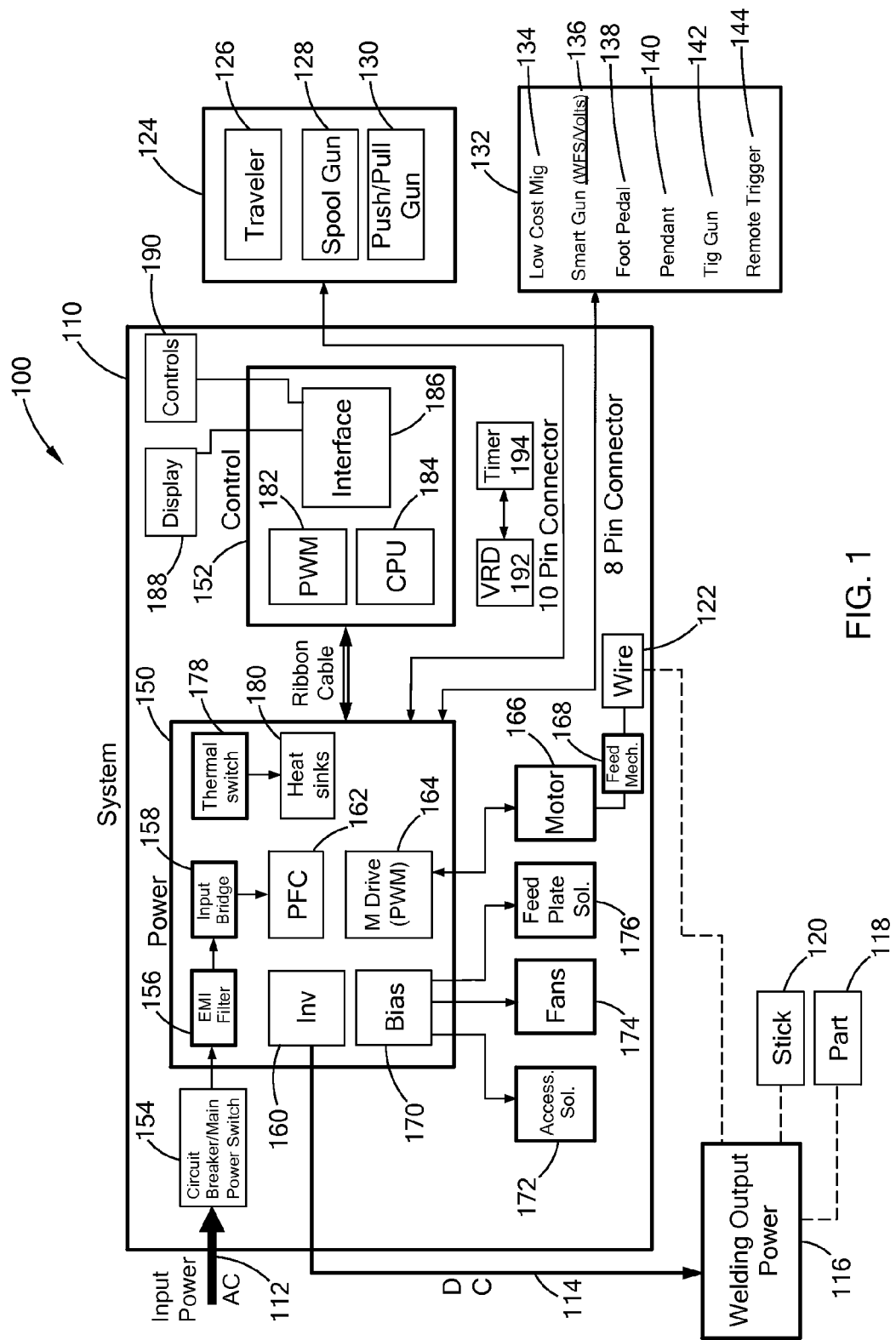
FIG. 1 is a schematic view of a welding system.

Now referring to FIG. 1, a power supply for a welding system 100 is provided. The power supply 110 receives input power 112 which may be an alternating current power line for example a 220 volt AC power line. Although it is understood that the power supply 110 may be adaptable to receive a range of voltages for example between 187 to 276 volts AC. In addition, it may also be possible to configure the power supply for other voltage ranges depending on the application and required welding output power. The power supply 110 provides a direct current power output voltage 114 that may be used as a welding output power 116. In some implementations, the power supply 110 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding techniques. Therefore, in one example the current return lead of the welding output power 116 may be provided to a part 118 that is to be welded, and the supply voltage may be provided to an electrode, for example a stick 120 or wire 122. Therefore, as the stick 120 comes in contact with the part 118 an arc may be formed that melts both the base metal and electrode and cooperates to form a weld. In other implementations, the output voltage may be provided through a wire 122 where the wire 122 may be continuously fed to the part to form a continuous weld. In TIG mode the electrode is not melted, generally only the base metal is melted.

The power supply 110 may control the output voltage and the output current, as well as the feeding of the wire to optimize the welding process. In addition, the power supply 110 may be connected to one group of accessories 124 including for example a remote wire feeder 126, a spool gun 128, or a push/pull gun 130. Further, the power supply 110 may be connected to other groups of accessories 132 for example through an 8-pin connector. The second group of accessories 132 may include a MIG gun 134, a smart gun 136, a foot pedal 138, a pendant 140, a TIG gun 142, and/or a remote control/trigger 144.

Within the power supply 110, the input power 112 may be provided to a circuit breaker or switch 154. Power may be provided from the circuit breaker 154 to a power circuit 150. The power circuit 150 may condition the input power to provide a welding output power 116, as well as, for powering various additional accessories to support the welding process. The power circuit 150 may also be in communication with the control circuit 152. The control circuit 152 may allow the user to control various welding parameters, as well as, providing various control signals to the power circuit 150 to control various aspects of the welding process. The power from the circuit breaker 154 may be provided to an EMI filter 156 of the power circuit 150. Power is provided from the EMI filter 156 to an input bridge 158. Power may be provided from the input bridge 158 to a conditioning circuit 162. The conditioning circuit 162 may include a boost circuit, a transformer, as well as a power factor correction circuit. Power is provided from the conditioning circuit 162 to the inverter 160 where the power is converted to a DC signal 114 thereby providing welding output power 116. Power may also be provided to a bias circuit 170 to power a number of accessories internal or external to the power supply 110 that facilitate operation of the power supply, as well as, the welding process For example, the bias circuit 170 may provide power to gas solenoid valves 172, fans 174, as well as, other accessory devices. In addition, power is provided to a motor drive circuit 164 that is in communication with a motor 166. The motor 166 may be in communication with a feed mechanism 168 configured to feed wire 122 to a weld gun for use in creation of the weld. The control circuit 152 may provide control signals to any of the previously mentioned circuits in the power circuit 150 to optimize the weld process and performance of the power supply 110. The control circuit 152 may include a pulse width modulator 182 and a processor 184 for analyzing various weld characteristics and calculating various weld parameters according to user settings, as well as, various feedback signals. In addition, an interface circuit 186 may be provided to control a display 188 that may provide information to the user of the welding system. The display 188 may include an LED display, a LCD display, or various other known display technology. The display may provide various menu choices to the user, as well as, providing various feedback on the welding process including the values of various parameters or graphs of previous welding characteristics. The controls 190 may also be in communication with the interface circuit 186 to allow the user to provide input such as various welding parameters to control the operation of the welding process.

The power supply 110 may further include a voltage reducing device (VRD) circuit 192, a low-power circuit that detects contact between the part 118 to be welded and the electrode. When an open circuit condition is detected between the electrode and the work piece, the VRD circuit 192 may reduce the maximum open circuit voltage to safe levels. When contact is made and/or the load is below a threshold resistance, the VRD circuit 192 may no longer reduce the voltage and thus may allow the welding system 100 to operate at full power. The VRD circuit 192 may be in communication with a timer 194. The timer 194 may be implemented as software as part of the control circuit 152, or may be comprised of an electronic circuit.

Figure 2:
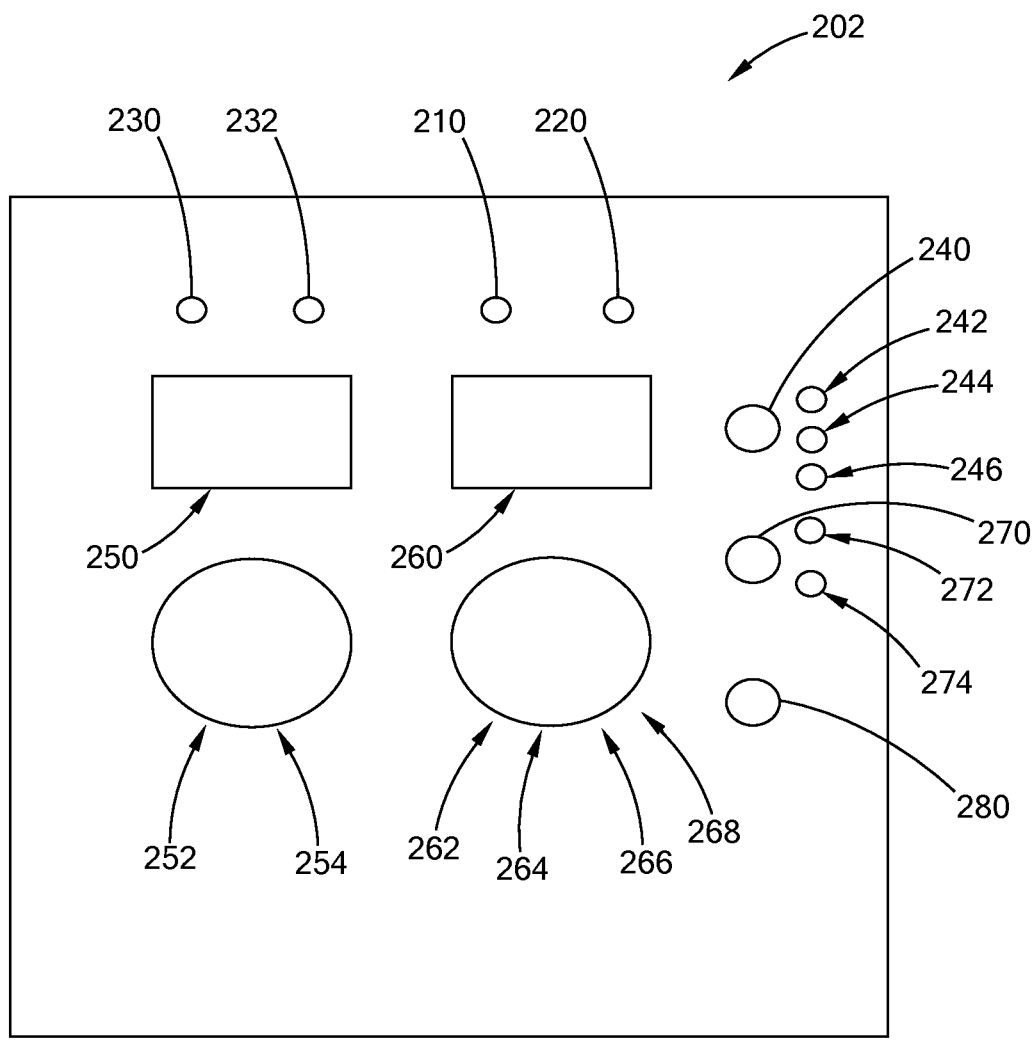
FIG. 2 is a schematic view of an interface for a welding system.

Now referring to FIG. 2, a particular implementation of an interface 200 is provided that may include various inputs selectable by a user and various indicators and displays. A power indicator 210 may indicate when the power supply 110 is receiving the input power 112. A fault light 220 may indicate when the welding process has entered a fault condition. A VRD "on" indicator 230 may indicate when the VRD is on, and a VRD "off" indicator 232 may indicate when the VRD is off.

A mode selection input 240 may allow the user to select a desired welding process. The mode selection input 240 may be a button which when pressed causes the power supply 100 to cycle through and select a welding process. Three welding process indicators 242, 244, 246 may respectively light upon selection of, for example, MIG, TIG, or stick welding. The MIG selection provides a suitable configuration for both gas metal arc welding and flux core arc welding.

A trigger interlock input 270 may allow a user to select between 2T and 4T modes for MIG, TIG and stick welds that are activated via an electric switch. The 2T mode allows the user to push and hold the switch to activate and release the switch to deactivate. The 4T mode allows the user to push and release the switch to activate, then push and release the switch again to deactivate. An indicator 272 may light when the 2T mode is selected, and an indicator 274 may light when the 4T mode is selected.

An amperage input 252 may allow a user to select a desired output current. A wire feed speed input 254 may allow a user to select a desired wire feed speed of the wire 122. The desired wire feed speed may be a desired steady-state wire feed speed. In some implementations, the inputs 250 and 252 may be combined into an adjustable knob. A user may press the adjustment knob to cycle between the inputs 252 and 254, and then turn the adjustment knob to select a desired value of the current or wire feed speed. The selected desired value may be displayed on a display 250, which may be a super bright red LED display.

A voltage input 262 may allow a user to select a desired output voltage of the welding signal. An inductance input 264 may allow a user to select a desired inductance which, for example, may optimize weld bead characteristics. An arc force input 266 may allow a user to select desired properties of arc force. A down slope input 268 may allow a user to select a down slope time, which is a function of the down ramp rate of the output current. In some implementations, the inputs 262, 264, 266, and 268 may be combined into an adjustable knob. A user may press the adjustment knob to cycle between the inputs 262, 264, 266, and 268, and then turn the adjustment knob to select a desired value of the voltage, inductance, arc force, or down slope. The selected desired value may be displayed on a display 260, which may be a super bright red LED display.

An advanced features input 280 may allow a user to select menus and toggle through various further inputs, which are displayed on the displays 250 and 260. A MIG welding main menu may provide inputs for operation control, pre-flow, spot on/off, spot time, stitch on/off, stitch time, dwell time, run-in percentage, post-flow, burn back time, wire sharp, and/or a setup submenu. The setup submenu may provide inputs for wire feed units, amperage calibration, voltage calibration, wire speed calibration, arc hour display, VRD (on, off or triggered), total weld energy (for heat input computation), and/or factory defaults. A stick welding main menu may provide inputs for operation control, hot start on/off, hot start time, hot start amperage, and/or a setup submenu. The setup submenu may provide inputs for arc hour display, VRD disable, and factory defaults. The TIG main menu may provide inputs for operation control, pre-flow, post-flow, and a setup submenu. The setup submenu may provide inputs for arc hour display, VRD disable, and factory defaults.

Burn back time may refer to an adjustable period of time that the power supply 110 may provide power for the welding process after the wire feed stops in order to burn back the wire and prevent it from sticking in the weld puddle. Wire sharp refers to the application of predetermined current outputs applied to the wire, for example, a rapid series of powerful current pulses after the motor 166 is de-energized. This prevents a ball of molten metal from freezing on the end of the welding wire, and tapers the end of the weld wire to a sharp point, promoting a cleaner start when welding resumes. The current outputs terminate when an open-circuit is detected or after a predetermined time or condition is reached. Run-in percentage refers to a percent of wire feed speed. The percentage may range, for example, from about 25 percent to about 150 percent of the wire feed speed. The run-in setting may, for example, allow a user to temporarily alter the selected wire feed speed to optimize MIG weld start characteristics.

The control circuit 152 may receive each of the quantities respectively associated with each of the inputs. Further, although the above inputs are shown in particular implementations, each of the inputs may be configured as a dial, adjustment knob, button, or switch, for example. Additionally, in some implementations, some of the inputs may be automatically selected by the control circuit 152. Which inputs are automatically selected and which inputs are user-selectable may depend on which welding process is selected. In some implementations, some parameters, for example wire diameter, material, gas, and joint design, may not be programmed into the control circuit 152.

The system may also be configured for gas metal arc or flux core arc welding. Voltage and wire feed speed can be the primary control signals of a gas metal arc or flux core arc welding machine. Voltage and wire feed speed may automatically be reduced in unison to ensure that a weld operation can be completed without interruption. In some examples, the voltage and wire feed speed may be reduced proportionally or according to a predefined relationship, such as the linear relationship: voltage=(scale*wire feed speed)+offset. Although in some implementations the predefined relationship can be exponential, quadratic, or may follow other functions.

To effectuate a certain reduction in power the control circuit determines a voltage reduction, for example from a lookup table or calculation, and a reduction in wire feed speed, for example from a lookup or calculation, to maintain the relationship between voltage and wire feed speed based on the desired reduction in power. The system may reduce the voltage and wire feed speed even when user settings or technique would otherwise cause power output to exceed capacity of welding power supply. The coordinated reduction may be scaled to counter a momentary power excess in a manner that prevents or mitigates instability.

In some implementations, the relationship of the voltage and wire speed may be determined based on wire diameter, wire type, shielding gas mixture, and electrical stickout. However, the in the same manner as discussed elsewhere in this application, the system may control one or more of voltage, wire speed, wire diameter, wire type, shielding gas mixture, or electrical stickout in combination, if the computed power output exceeds a power threshold, such as the power supply capacity.

In some implementations, the system uses software to automatically reduce wire feed speed and current, but the feedback could also be accomplished, in part or in full, using electronic circuits or specialized integrated circuits. A nominal power output differential may be correlated to a voltage differential and also correlated to a separate wire speed differential. The relationship can be defined in absolute units (e.g.: volts per kilowatts, or inches-per-minute per kW) or relative terms (e.g.: percentage of user selected voltage or wire speed per kW). In some implementations, the settings may be optimized for 0.035 inch wire. Further, the output power may be calculated as the product of short term averages of measured weld voltage and current. Although in some implementations the system could also compute the output power based on instantaneous measurements of voltage and current. When the computed output power begins to surpass the capability of the power supply, the voltage and wire speed are reduced to counteract the computed excess power draw. As such, the system may compare the output power to a predefined power threshold and modify the voltage and wire feed based on the power output. Because the GMAW and FCAW output current is principally a function of wire feed rate, the temporary reduction of voltage and wire speed curtails both voltage and current, and thus reduces output power moments after the change. In some implementations, a proportional-integral-derivative (PID) control scheme could be incorporated into the feedback loop to further improve stability or responsiveness. To ensure the reduction of the voltage and wire feed rate does not jeopardize qualified weld procedures, visual warning of the reduced output power is indicated on the display, for example via a message on an LED display. The warning could be triggered based on the power threshold, reduced voltage, and/or reduced wire feed speed. However, other warnings could be provided with other visual means or with auditory, vibration or other sensory cues. Hysteresis may be used in the error display to ensure that spurious events do not result in false-positive warnings.

In some implementations, a PID loop is utilized and may be implemented in software. In addition, an analog output from a microprocessor regulates voltage from a switched power supply and a PWM output from the same controller governs wire feed speed. Control signals may also be established with analog feedback circuit elements and could be applied to most power supply topologies.

The primary settings, including voltage, wire feed speed, and inductance, of a GMAW or FCAW power supply and feeder can be configured to accommodate a wide variation of electrodes, gases, base materials, weld positions and joint designs. Consequently, the controls may often be set, carelessly or deliberately, past the rated power capacity of the welding power supply.

Some welding machines designs could abruptly cease operating when overloaded. Other designs may exhibit oscillation or long-term degradation of output parameters, sometimes with no indication of potentially-compromised weld characteristics. However, the design described herein allows the operator to continue welding with a stable output and without nuisance interruption when the combination of their selected settings, possibly influenced by variation in welding technique and environmental factors, cannot be delivered by the welding power supply. A warning is prominently displayed to warn the operator if the machine was unable to supply sufficient power to match the selected voltage and wire speed. Professional welders can choose to rework the weldment if the reduced output compromises strength, safety or certification. Welders of all abilities have the option to ignore the warning if chosen voltage and wire speed are not critical variables in the weld procedure.

Figure 3:
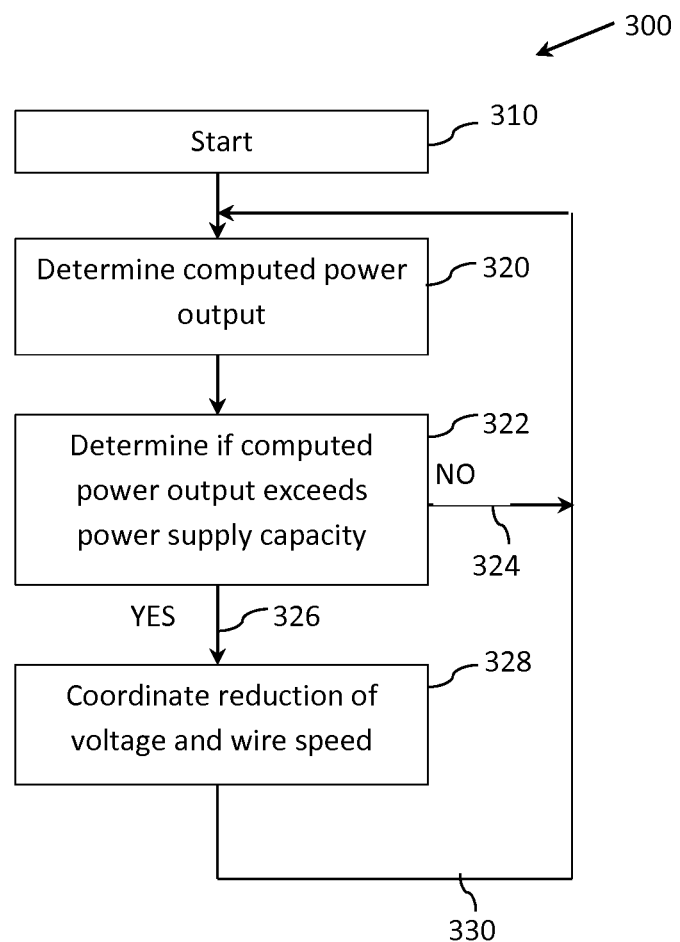
FIG. 3 is a flow chart illustrating a method of reducing voltage and wire speed.

Now referring to FIG. 3, a method 300 is provided for coordinating the reduction of voltage and wire speed. The method begins in block 310 and in block 320 the computed power output is determined. In block 322, the system determines if the computed output exceeds a power threshold, for example the power supply capacity. The power threshold may be high threshold or low threshold and may be determined by the user. If the computed power output does not exceed the power threshold, the method follows line 324 to block 320 where the method continues. If the computed power output does exceed a power threshold, such as the power supply capacity, the method follows line 326 to block 328. In block 328, the system coordinates the reduction of voltage and wire speed. As described above, the reduction of voltage and wire speed may be controlled according to a predefined relationship. Accordingly, the appropriate voltage may be selected for the reduction in power. Further, the appropriate wire feed speed may be selected for the reduction in power, as well as, maintaining the proper relationship with the voltage. In one implementation, the input settings would decrease 2.9 volts and 26 inches per minute for each kilowatt of excess power. The method then follows block 330 to block 320 where the method continues.

Figure 4:
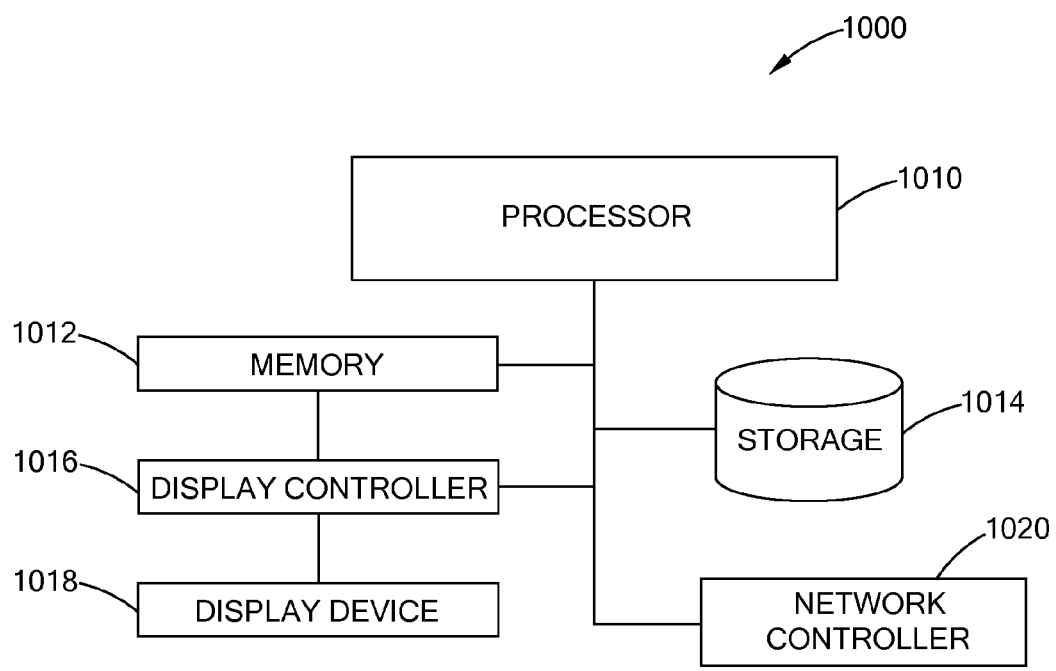
FIG. 4 is a schematic view of a processing system for implementing the methods described herein.

Any of the controllers, control circuits, modules, servers, or engines described may be implemented in one or more computer systems or integrated controllers. One exemplary system is provided in FIG. 4. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for generating a weld, the system comprising:
a power circuit for generating welding output power;
a control circuit in communication with a voltage reducing device circuit of the power circuit to reduce voltage when a calculated welding output power exceeds a predefined power threshold, the voltage reducing device circuit being electrically responsive to the control circuit and reducing a maximum open circuit voltage in response to an open circuit condition being detected between an electrode and a work piece, the control circuit further in communication with a feed mechanism to simultaneously reduce wire feed speed of the feed wire to a weld gun.

2. The system according to claim 1, wherein the voltage and wire feed speed are reduced proportionally.

3. The system according to claim 1, wherein the voltage and wire feed speed are reduced according to a predefined relationship.

4. The system according to claim 1, wherein the reduction in the voltage and wire feed speed are scaled such that a momentary power excess is countered in a manner that mitigates oscillation or periodic variation of voltage.

5. The system according to claim 1, wherein the reduction in the voltage and wire feed speed are scaled such that a momentary power excess is countered in a manner that mitigates oscillation or periodic variation of wire speed.

6. The system according to claim 1, wherein the reduction in the voltage and wire feed speed are scaled such that a momentary power excess is countered in a manner that mitigates oscillation or periodic variation of current.

7. The system according to claim 1, wherein the reduction in the voltage and wire feed speed are scaled such that a momentary power excess is countered in a manner that mitigates oscillation or periodic variation of power.

8. The system according to claim 1, wherein the reduction in the voltage and wire feed speed are scaled such that a momentary power excess is countered in a manner that mitigates oscillation or periodic variation of one or more of: voltage, wire speed, current or power.

9. The system according to claim 1, wherein the reduction of the voltage and wire feed speed is based on a nominal power output differential that is correlated to a voltage differential.

10. The system according to claim 1, wherein the reduction of the voltage and wire feed speed is based on a nominal power output differential that is correlated to a voltage differential and also correlated to a separate wire speed differential.

11. The system according to claim 1, wherein the control circuit calculates the output power as the product of short term averages of measured weld voltage and current.

12. The system according to claim 1, wherein the control circuit calculates the output power based on instantaneous measurements of voltage and current.

13. The system according to claim 1, wherein the control circuit compares the output power to a predefined power threshold and modifies the voltage and wire feed based on the power output.

14. The system according to claim 1, wherein the control circuit implements a proportional-integral-derivative (PID) control scheme to improve stability or responsiveness of the voltage and wire feed speed.

15. The system according to claim 1, wherein the control circuit provides a warning of the reduced output power.

* * * * *